T. S. Whitenack.
Mower.

Nº 1212
No. 32,216.

Patented Apr. 30, 1861

Witnesses
J. W. Coombs
R. S. Spencer

Inventor
T. S. Whitenack
per Munn & Co
attorneys

UNITED STATES PATENT OFFICE.

THOMAS S. WHITNACK, OF EASTON, PENNSYLVANIA.

IMPROVEMENT IN HARVESTING-MACHINES.

Specification forming part of Letters Patent No. 32,216, dated April 30, 1861.

*To all whom it may concern:*

Be it known that I, T. S. WHITNACK, of Easton, in the county of Northampton and State of Pennsylvania, have invented a new and Improved Harvesting-Machine; and I do hereby declare that the following is a full, clear, and exact description of the same, reference being had to the annexed drawings, making a part of this specification, in which—

Figure 2:
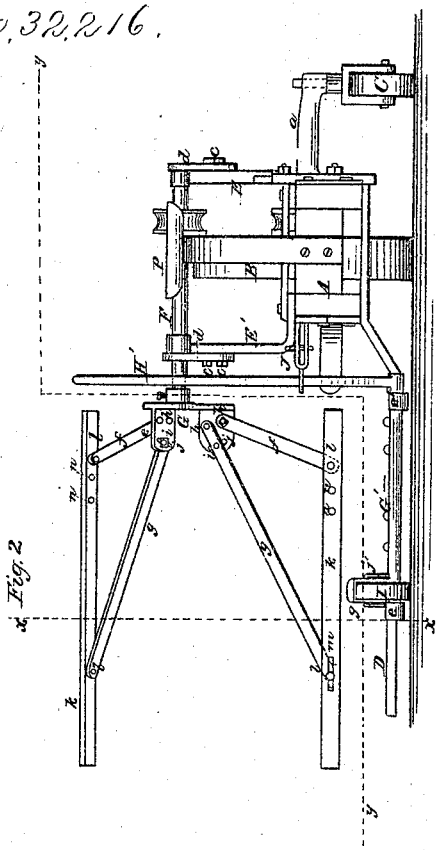
Figure 5:
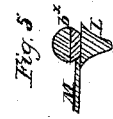
Figure 4:
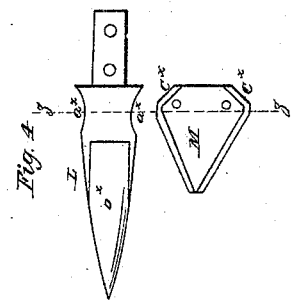
Figure 1:
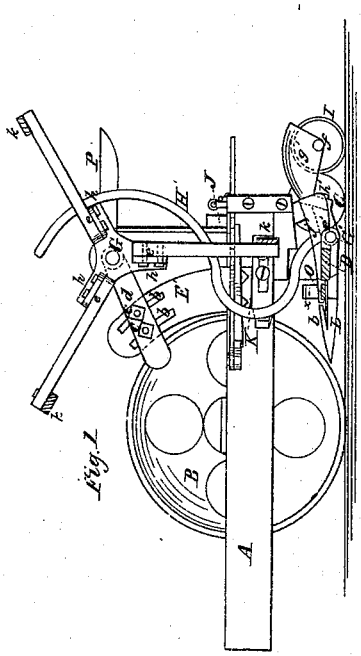
Figure 3:
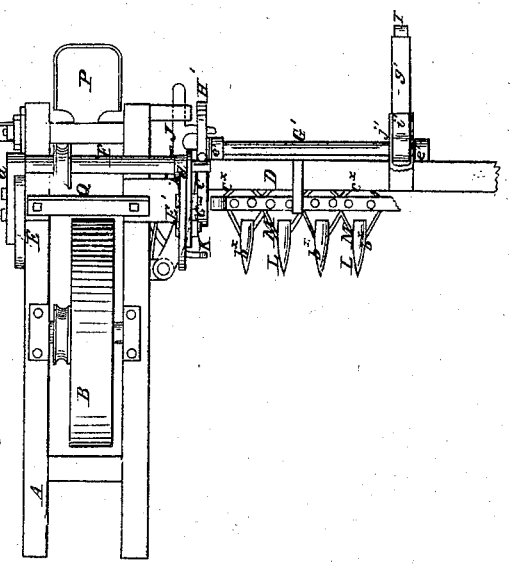

Figure 1 is a vertical section of my invention, taken in the line $x\ x$, Fig. 1; Fig. 2, a back view of the same; Fig. 3, a plan or top sectional view of the same, taken in the line $y\ y$, Fig. 2; Fig. 4, a detached plan or top view of one of the fingers and one of the sickle-teeth; Fig. 5, a transverse section of the same, taken in the line $z\ z$, Fig. 2.

Similar letters of reference indicate corresponding parts in the several figures.

To enable those skilled in the art to fully understand and construct my invention, I will proceed to describe it.

A represents the main frame of a harvester, in which a wheel, B, is placed, and C is a caster-wheel, which is attached to an arm, $a$, at the back part of the main frame. D is the finger-bar, which is attached to the main frame A, and projects therefrom at right angles, as shown clearly in Fig. 3.

To the back part of the main frame A there are attached two curved or segment bars, E E′, one at each side. These bars are each provided with two curved slots, $b\ b$, through which bolts $c$ pass, said bolts securing arms $d\ d$ to the bars E E′, the outer ends of the arms $d$ serving as bearings for a shaft, F. The segment-bars E E′ form segments of circles of which the shaft of wheel B is the center.

To the inner end of the shaft F there is attached a metal plate or head, G, which has ears or lugs $e$, projecting from its face at right angles. To each ear or lug $e$ there are attached two arms or braces, $f\ g$, by screws or bolts $h$, the arms or braces being allowed to work freely on said screws or bolts. The arm or brace $g$ of each ear or lug $e$ may be secured in a more or less inclined position by a screw, $i$, which passes through a curved slot, $j$, concentric with its screw or bolt $h$. (See Fig. 2.) To the outer ends of the arms or braces $f\ g$ bars $k$ are attached, said bars forming beaters to act upon the grain in front of the sickle. The bars or beaters $k$ are attached to the ends of the arms or braces $f\ g$ by bolts $l$, which pass through oblong slots $m$ in the beaters, or through either of a series of holes, $n$. (See Fig. 2.) By this arrangement it will be seen that the beaters or bar $k$ may be adjusted farther in or out, as desired, and always kept parallel with each other and the shaft F, the parallelism of the bars or beaters $k$ being preserved by adjusting the bolts $l$ in the holes $n$, or adjusting the bars or beaters on the bolts if the oblong slots $m$ are used. An expanding reel is thus obtained by a very simple means.

The reel may be raised or lowered bodily by adjusting the arms $d\ d$ on the segment-bars E E′, and in consequence of the bars E E′ being segments of circles of which the axle of wheel B is the center, this adjustment of the reel will not affect the belt which communicates motion to reel-shaft F from the axle of wheel B. This belt may be tightened at any time when necessary by adjusting the bars E E′ a little back on the main frame A.

To the back part of the finger-bar D there are attached two eyes or bearings, $e'\ e'$, in which a shaft, G′, is fitted and allowed to turn freely. This shaft G′ has a curved lever, H′, attached to its inner end, and to the outer end of said shaft there is attached a caster-wheel, I, the axis $f$ of which passes through the lower part of a cap or socket, $g$, which serves as a covering and protector for the wheel I. The cap or socket $g$ has a pintle, $h'$, in its upper end, which pintle passes through an arm, $i'$, attached to shaft G, and forms the joint of the caster-wheel. This joint is protected by a hood or cover, $j'$, which is attached to the finger-bar D. By this arrangement it will be seen that neither the axis $f$ of the caster-wheel nor the joint $h$ of its socket $g$ can be choked or clogged by cut grass or grain, nor can the caster-wheel interfere in any way with the passage of the cut grass or grain over the finger-bar.

The caster-wheel I supports the outer part of the finger-bar D, and also serves as a means in connection with lever H to raise and lower the sickle and finger-bar. When the sickle and finger-bar are fully elevated, the lever H′ is retained in a backward position by a spring-catch, J, and when the machine is at work the height of the sickle and finger-bar is regulated by adjusting a bar, K, at the inner side of the frame A, said bar serving as a bearing for the lever H, and consequently retaining the finger-bar and sickle at the desired height.

The fingers L of the finger-bar D are attached to the under side of the bar D, and the face sides of the fingers, at their back part, adjoining the finger-bar, are of concave form at each side, as shown at $a^x$ in Fig. 4, and these concave parts have cutting-edges, as also have the front parts of the face sides over which the cutters or teeth M of the sickle work. The fingers are provided with the usual caps, $b^x$.

The teeth M are attached to a bar, O, and their front parts are of the usual taper or pointed form, but their back parts extend or project beyond the bar O, and have beveled cutting-edges, as shown at $c^x$ in Fig. 4. This arrangement, it will be seen, allows of a double-cutting action of the sickle, one cut being in front of the bar O and the other being behind it, and all substances that may chance to be drawn under the bar O and escape the cutting action of the teeth in the bar O will be acted upon by the back part $c^x$ of the teeth M. By this arrangement the sickle is effectually prevented from choking or clogging.

The driver's seat P is at the back part of the main frame A, and the lever H is within reach of the driver thereon. A foot-piece, Q, is placed transversely on the main frame, as shown in Fig. 3.

Having thus described my invention, what I claim as new, and desire to secure by Letters Patent, is—

1. Constructing the reel-head G with plane plates or ears $e$ for the attachment of the adjustable arms $f$ $g$, in combination with the said adjustable arms and the adjustable bars $k$, all as set forth.

2. The arrangement of the slotted supporting-segments E E′, having their sweep concentric with the axis of the driving-wheel B, in combination with the adjustable arms $d$, shaft F, and the reel, in the manner and for the purpose herein shown and described.

THOS. S. WHITNACK.

Witnesses:
F. M. NOBLE,
T. H. BECKER.